United States Patent
Takahata (10) Patent No.: US 12,006,563 B2
(45) Date of Patent: Jun. 11, 2024

(54) CORROSION RESISTANT CuZn ALLOY

(71) Applicant: JX Nippon Mining & Metals Corporation, Tokyo (JP)

(72) Inventor: Masahiro Takahata, Ibaraki (JP)

(73) Assignee: JX Metals Corporation, Tokyo (JP)

( * ) Notice: Subject to any disclaimer, the term of this patent is extended or adjusted under 35 U.S.C. 154(b) by 238 days.

(21) Appl. No.: 16/346,349

(22) PCT Filed: Sep. 25, 2018

(86) PCT No.: PCT/JP2018/035491
§ 371 (c)(1),
(2) Date: Apr. 30, 2019

(87) PCT Pub. No.: WO2019/097846
PCT Pub. Date: May 23, 2019

(65) Prior Publication Data
US 2021/0317550 A1    Oct. 14, 2021

(30) Foreign Application Priority Data

Nov. 15, 2017    (JP) .................................. 2017-220473

(51) Int. Cl.
  *C22C 9/04*   (2006.01)
  *C21D 8/06*   (2006.01)
  *C22C 1/02*   (2006.01)
  *C22F 1/00*   (2006.01)

(52) U.S. Cl.
  CPC ............ *C22C 9/04* (2013.01); *C21D 8/06* (2013.01); *C22C 1/02* (2013.01); *C22F 1/00* (2013.01)

(58) Field of Classification Search
None
See application file for complete search history.

(56) References Cited

U.S. PATENT DOCUMENTS

| | | |
|---|---|---|
| 4,769,087 A | 9/1988 | Genereux et al. |
| 6,566,622 B1 | 5/2003 | Barthel et al. |
| 2004/0165638 A1 | 8/2004 | Morton et al. |
| 2005/0047471 A1 | 3/2005 | Steiger et al. |
| 2005/0189327 A1 | 9/2005 | Kawamoto et al. |
| 2009/0239094 A1 | 9/2009 | Hatano |

(Continued)

FOREIGN PATENT DOCUMENTS

| | | |
|---|---|---|
| JP | S59173251 A | 10/1984 |
| JP | 63125649 | 5/1988 |

(Continued)

OTHER PUBLICATIONS

English language machine translation of JP-2009185341-A. Generated Dec. 15, 2023. (Year: 2023).*

(Continued)

*Primary Examiner* — Brian D Walck
(74) *Attorney, Agent, or Firm* — Faegre Drinker Biddle & Reath LLP (57) ABSTRACT

The present invention provides a corrosion-resistant CuZn alloy, the alloy having a Zn content of from 15 to 55% by mass, the balance being Cu and inevitable impurities, wherein a total content of Zn and Cu is 99.995% by mass or more, and wherein a number of pores is $1/cm^2$ or less based on optical microscopic observation.

9 Claims, 9 Drawing Sheets

(56) References Cited

U.S. PATENT DOCUMENTS

2012/0155501 A1    6/2012   Ferrasse et al.
2016/0126689 A1    5/2016   Kardokus et al.

FOREIGN PATENT DOCUMENTS

| | | |
|---|---|---|
| JP | 05311424 A | 11/1993 |
| JP | 2005224913 A | 8/2005 |
| JP | 2007500942 A | 1/2007 |
| JP | 2007510284 A | 4/2007 |
| JP | 2009185341 A * | 8/2009 |
| JP | 2015527726 A | 9/2015 |
| JP | 2016132816 A | 7/2016 |
| TW | 469199 B | 12/2001 |
| WO | 2007139072 A1 | 12/2007 |

OTHER PUBLICATIONS

Li et al. "Mechanical alloying process of Cu—Zn system studied by 63Cu nuclear magnetic resonance." J. Appl. Phys. 75, 1783-1788 (1994) (Year: 1994).*

Yamada et al. "Effects of microstructural factors and alloying elements on dezincification of brass." Journal of Advanced Science, vol. 13, No. 3, 2001. pp. 277-280. (Year: 2001).*

JP Office Action for corresponding JP Application No. 2017-220473, dated Sep. 1, 2020, 8 pages.

EP Office Action for corresponding EP Application No. 18863803.5, dated Jan. 11, 2021, 4 pages.

Extended European Search Report for corresponding EP App. No. 18863803.5 to PCT/JP2018035491 dated Mar. 3, 2020, 6 pages.

International Search Report (PCT/ISA/210 for PCT/JP2018/035491 dated Nov. 15, 2017, 8 pages.

* cited by examiner

sample 1  left x100, right x400

[FIG. 5]

sample 2 left x100, right x400

[FIG. 6]

sample 3  Left x100, Right x400

[FIG. 7]

sample 4  Left x100, right x400

CORROSION RESISTANT CuZn ALLOY

TECHNICAL FIELD

The present invention relates to a corrosion-resistant CuZn alloy that can be suitably used for electrodes employed in an acidic atmosphere.

BACKGROUND ART

Recently, pulsed laser light has been used for integrated circuit photolithography. The pulsed laser light can be generated by applying gas discharge between a pair of electrodes at very short electric discharge and very high voltage in a gas discharge medium. For example, in ArF laser systems, fluorine-containing plasma is generated between the pair of electrodes during operation. The fluorine-containing plasma is highly corrosive to metals. As a result, the electrodes corrode over time during operation of a pulsed laser generator. The corrosion of the electrodes forms a corrosion spot, which causes arcing in the plasma, thereby further accelerating shortening of an electrode lifetime. For the electrodes, for example, a CuZn alloy is used.

As a technique for prolonging the electrode lifetime, a technique for stably using an electrode for a long period of time have been developed (Patent Documents 1 and 2), in which a body portion of a discharging electrode made of a CuZn alloy is partially exposed (a discharge receiving area) for discharge and other portions are covered with other alloy. On the other hand, in addition to such improvement of the structure of the electrode, Patent Document 3 discloses a technique for prolonging the electrode lifetime by using phosphorus-doped brass as a copper alloy used for the electrode to reduce generation of micro pores in the brass.

CITATION LIST

Patent Literatures

Patent Document 1: Japanese Patent Application Publication No. 2007-500942 A
Patent Document 2: Japanese Patent Application Publication No. 2007-510284 A
Patent Document 3: Japanese Patent Application Publication No. 2015-527726 A

SUMMARY OF INVENTION

Technical Problem

Even in the prior arts attempting to prolong the electrode lifetime by improving the structure of the electrode, the electrode lifetime can be further prolonged if corrosion resistance of the CuZn alloy is improved. Further, in the technique for prolonging the lifetime by using phosphorus-doped brass, a burden of an increase in the number of steps is caused due to a step of doping the CuZn alloy with phosphorus to a target concentration, but it is preferable that such a burden can be avoided.

Thus, an object of the present invention is to provide a CuZn alloy having improved corrosion resistance without adding other elements.

Solution to Problem

As a result of intensive studies, the present inventors have found that a CuZn alloy having a composition as described below is subjected to hot forging and hot isotropic pressing, thereby exerting improved corrosion resistance without adding other elements, and have arrived at the present invention.

Thus, the present invention includes the following aspects (1) to (6):

(1)
A corrosion-resistant CuZn alloy, the alloy having a Zn content of from 15 to 55% by mass, the balance being Cu and inevitable impurities, wherein a total content of Zn and Cu is 99.995% by mass or more, and wherein a number of pores is $1/cm^2$ or less based on optical microscopic observation.

(2)
The CuZn alloy according to (1), wherein the total content of Zn and Cu is 99.999% by mass or more.

(3)
The CuZn alloy according to (1) or (2), wherein the CuZn alloy is an alloy for corrosion-resistant electrodes.

(4)
The CuZn alloy according to any one of (1) to (3), wherein the number of pores having a pore diameter of 10 μm or more is $0.1/cm^2$ or less based on the optical microscopic observation.

(5)
The CuZn alloy according to any one of (1) to (4), wherein the CuZn alloy has a content of P of 0.01 ppm or less.

(6)
The CuZn alloy according to any one of (1) to (4), wherein the CuZn alloy has a content of S of less than 0.05 ppm, a content of Fe of less than 5 ppm, a content of Co of less than 0.05 ppm, a content of Ni of less than 0.1 ppm, a content of As of less than 0.005 ppm, a content of Rh of less than 1 ppm, a content of Ag of less than 1 ppm, a content of Sn of less than 0.5 ppm, a content of Sb of less than 0.005 ppm, a content of Te of less than 0.05 ppm, a content of TI of less than 3 ppm, a content of Pb of less than 10 ppm, and a content of P of less than 0.05 ppm.

Further, the present invention includes the following aspects (11) to (20):

(11)
A method for producing a corrosion-resistant CuZn alloy, the method comprising the steps of:
subjecting a CuZn alloy to hot forging, the alloy having a Zn content of from 15 to 55% by mass, the balance being Cu and inevitable impurities, the alloy having a total content of Zn and Cu of 99.995% by mass or more; and
subjecting the hot-forged CuZn alloy to hot isotropic pressing.

(12)
The method according to (11), wherein the step of subjecting the CuZn alloy to the hot forging comprising subjecting a CuZn alloy obtained by vacuum melting to the hot forging.

(13)
The method according to (11) or (12), wherein the step of subjecting the CuZn alloy to the hot forging comprises subjecting the CuZn alloy to hot forging at a temperature in a range of from 600 to 900° C.

(14)
The method according to (11) or (12), wherein the step of subjecting the CuZn alloy to the hot forging comprises subjecting the CuZn alloy to hot forging under conditions where the CuZn alloy is drawn in a longitudinal direction so as to reduce a cross sectional area of an ingot to 60 to 80% of the original cross sectional area at a temperature in a range of from 600 to 900° C.

(15)

The method according to any one of (11) to (14), wherein the step of subjecting the hot-forged CuZn alloy to the hot isotropic pressing comprises subjecting the hot-forged CuZn alloy to hot isotropic pressing at a temperature in a range of from 450 to 650° C. for 1 to 8 hours under a pressure of from 100 to 200 MPa.

(16)

The method according to (11) to (15), further comprising a step of annealing the CuZn alloy subjected to the hot isotropic pressing, after the step of subjecting the hot-forged CuZn alloy to the hot isotropic pressing.

(17)

The method according to (16), wherein the step of annealing the CuZn alloy subjected to the hot isotropic pressing comprises annealing the CuZn alloy subjected to the hot isotropic pressing, at a temperature in a range of from 500 to 700° C. for 0.5 to 4 hours by air cooling or furnace cooling.

(18)

The method according to (11) to (17), further comprising finishing the CuZn alloy subjected to the hot isotropic pressing or the annealed CuZn alloy.

(19)

The method according to any one of (11) to (18), wherein the step of the CuZn alloy to the hot forging comprises a CuZn alloy having a content of P of 0.01 ppm or less to the hot forging.

(20)

The method according to any one of (11) to (19), wherein the method is a method for producing a CuZn alloy for corrosion-resistant electrodes.

Advantageous Effects of Invention

According to the present invention, a corrosion-resistant CuZn alloy is obtained. The corrosion-resistant CuZn alloy according to the present invention can be suitably used for electrodes employed in an acidic atmosphere, and is particularly suitable for electrodes of ArF laser systems and KrF laser systems. The corrosion-resistant CuZn alloy according to the present invention does not require the addition of other elements during the production and can be produced while avoiding the burden of an increase in the number of steps by those addition steps.

DESCRIPTION OF THE PREFERRED EMBODIMENTS

Hereinafter, the present invention will be described in detail by way of embodiments. The present invention is not limited to the specific embodiments as described below.

[Corrosion-Resistance CuZn Alloy]

A corrosion-resistant CuZn alloy according to the present invention is a CuZn alloy having a Zn content of from 15 to 55% by mass, the balance being Cu and inevitable impurities, wherein a total content of Zn and Cu is 99.995% by mass or more, and wherein a number of pores is $1/cm^2$ or less based on optical microscopic observation. The CuZn alloy can be suitably used as an alloy for corrosion-resistant electrodes.

[Zn Content and Cu Content]

The Zn content can be from 15 to 55% by mass, and preferably from 25 to 45% by mass, and more preferably from 35 to 40% by mass. The total content of the Zn content and the Cu content can be 99.995% by mass or more, and preferably 99.999% by mass or more.

[P Content]

In the present invention, the content of P as an inevitable impurity of the CuZn alloy may be 0.01 ppm or less. In a preferred embodiment, the P content may be 0.05 ppm or less, or less than 0.05 ppm, and preferably 0.01 ppm or less, and preferably 0.005 ppm or less, or less than 0.005 ppm.

[Inevitable Impurities]

In the present invention, as the inevitable impurities of the CuZn alloy, the content of each of the following elements can be as follows.

The S content may be 0.05 ppm or less, and preferably less than 0.05 ppm; the Fe content may be 5 ppm or less, and preferably less than 5 ppm; the Co content may be 0.05 ppm or less, and preferably less than 0.05 ppm; the Ni content may be 0.1 ppm or less, and preferably less than 0.1 ppm; the As content may be 0.005 ppm or less, and preferably less than 0.005 ppm; the Rh content may be 1 ppm or less, and preferably less than 1 ppm; the Ag content may be 1 ppm or less, and preferably less than 1 ppm; the Sn content may be 0.5 ppm or less, and preferably less than 0.5 ppm; the Sb content may be 0.005 ppm or less; the Te content may be 0.05 ppm or less, and preferably less than 0.05 ppm; the TI content may be 3 ppm or less, and preferably less than 3 ppm; the Pb content may be 10 ppm or less, and preferably less than 10 ppm; and the P content may be 0.05 ppm or less, and preferably less than 0.05 ppm.

[Pore]

In the corrosion-resistant CuZn alloy according to the present invention, the number of pores can be $1/cm^2$ or less, and preferably $0.1/cm^2$ or less, based on optical microscopic observation. An area ratio of the pores at this time is 0.00004%. The number of pores is determined by observing a surface of a sample with an optical microscope, counting the number of pores per a surface of 0.5 mm×0.5 mm at arbitrary 10 positions, and calculating an average value thereof. In this case, an observable object as a pore is a pore having a pore diameter of about 10 μm or more as a size of the pore.

In the corrosion-resistant CuZn alloy according to the present invention, the number of pores having a pore diameter of 10 μm or more may be $1/cm^2$ or less, and preferably $0.1/cm^2$ or less based on optical microscopic observation. The area ratio of the pores is 0.0004% or less, and preferably 0.00004% or less. For the pore diameter of the pore, a circumscribed circle was observed as the pore diameter of the pore, regardless of the shape of the pore.

[Corrosion Resistance]

The corrosion-resistant CuZn alloy according to the present invention has improved corrosion resistance in a fluorine-containing environment. The corrosion resistance in the present invention can be tested by a fluoronitric acid test described in Examples as severe conditions.

[Production of Corrosion-Resistant CuZn Alloy]

The corrosion-resistant CuZn alloy according to the present invention can be produced by a production method comprising the steps of: subjecting a CuZn alloy to hot forging, the alloy having a Zn content of from 15 to 55% by mass, the balance being Cu and inevitable impurities, the alloy having a total content of Zn and Cu of 99.995% by mass or more; and subjecting the hot forged CuZn alloy to hot isotropic pressing.

[CuZn Alloy]

As the CuZn alloy to be subjected to the hot forging, an alloy having the same composition as the above corrosion-resistant CuZn alloy can be used.

[Vacuum Melting]

In a preferred embodiment, a CuZn alloy obtained by vacuum melting can be used as the CuZn alloy to be subjected to the hot forging. The vacuum melting can be carried out, for example, by maintaining a raw material metal at a temperature in a range of from 900 to 1200° C., and preferably from 1000 to 1100° C., under a pressure of from 100 to 600 torr including an inert gas, and preferably from 300 to 500 torr, for 15 to 90 minutes, and preferably for 20 to 60 minutes.

[Hot Forging]

The hot forging can be carried out, for example, at a temperature in a range of from 600 to 900° C., and preferably from 700 to 900° C., such that that a reduction ratio of a cross sectional area of an ingot is from 50 to 80%, and preferably from 60 to 80%. In the hot forging, preheating may be carried out as desired, for example, by heating to the temperature in the above range for 1 to 15 hours,

[Hot Isotropic Pressing]

The hot isotropic pressing (HIP processing) is carried out in an inert gas, for example in an argon gas, at a temperature in a range of from 450 to 650° C., and preferably from 500 to 600° C., for 1 to 8 hours, and preferably 2 to 6 hours, while applying a pressure of from 100 to 200 MPa, and preferably from 120 to 180 MPa.

[Annealing]

In a preferred embodiment, the CuZn alloy subjected to the hot isotropic pressing may be annealed. The annealing can be carried out, for example, at a temperature in a range of from 500 to 700° C., and preferably from 550 to 650° C., for 0.5 to 4 hours, and preferably 1 to 3 hours, by means of air cooling or furnace cooling, or water cooling.

[Finishing]

In a preferred embodiment, the CuZn alloy subjected to the hot isotropic pressing or the annealed CuZn alloy can be subjected to finishing. The finishing can be performed, for example, by lathe processing.

[Alloy for Corrosion-Resistant Electrode]

The corrosion-resistant CuZn alloy according to the present invention has improved corrosion resistance in a fluorine-containing environment, so that it can be suitably used as an alloy for corrosion-resistant electrodes. The corrosion-resistant CuZn alloy according to the present invention exerts improved corrosion resistance while avoiding secondary impurity contamination caused by doping treatments for adding other elements, so that it can be used as a highly purity electrode material. The corrosion-resistant CuZn alloy according to the present invention can form an electrode having improved corrosion resistance by using a technique for improving corrosion resistance by improvement of the electrode structure of the prior art.

EXAMPLES

Hereinafter, the present invention will be described with reference to Examples. The present invention is not limited to the following Examples. Other examples and variations within the spirit of the present invention are included in the present invention.

[Production Example 1] (Example)

A CuZn alloy was produced as follows.

The following Cu raw materials and Zn raw materials were prepared as raw materials:

Cu raw material: high purity metallic copper (6N) (purity 99.9999%); and

Zn raw material: high purity metal zinc (4N5) (purity 99.995%).

28.35 kg of the raw material Cu and 17.15 kg of the raw material Zn were subjected to vacuum melting (conditions: vacuum-drawn to $10^{-1}$ Pa and then set to 400 torr atmosphere and maintained at 1050° C. for 30 minutes) to obtain a high purity CuZn alloy. An ingot pipping portion at an upper portion of the ingot was removed from the resulting CuZn alloy, and forging was carried out for the ingot having φ 132, a length of 275 mm, and a weight of 31.5 kg.

Forging was carried out by preheating the ingot at a temperature of 850° C. for 3 hours, and carrying out reheating in four steps of: firstly from φ 135 to φ 130 and then φ 130→80 mm square→50 mm square→φ41 mm at 850° C. for 10 minutes or more in each step. That is, the hot forging process was conducted by carrying out the reheating at 800° C. for 10 minutes or more every time the forging was performed to draw the ingot in the longitudinal direction so as to reduce the cross sectional area of the ingot to 60 to 80% of the original cross sectional area. After carrying out the forging up to φ 41, the ingot was cut every a length of 650 mm to obtain four forged rods.

The high purity CuZn alloy thus subjected to the hot forging was subjected to hot isotropic pressing (HIP processing) at 525° C. for 4 hours under Ar of 150 MPa.

An annealing treatment was then performed by air cooling at 600° C. for 2 hours.

The high purity CuZn alloy thus processed was subjected to finishing under the following conditions to obtain a high purity CuZn rod (high purity+HIP product) (sample 1).

Figure 1:
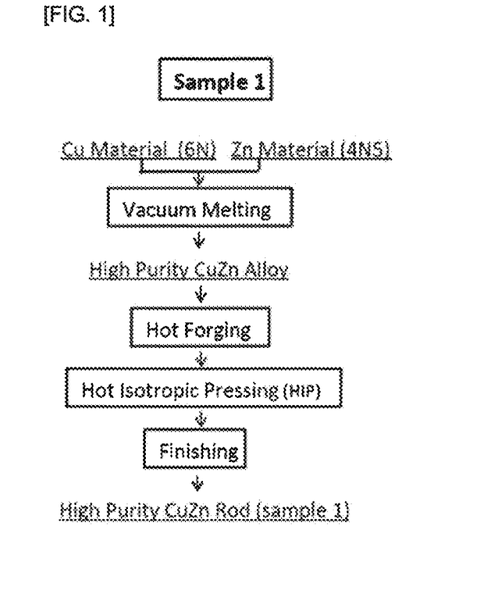
FIG. 1 is an explanatory view of a procedure in Production Example 1.

An explanatory view of the procedure of Production Example 1 is shown in FIG. 1.

[Production Example 2] (Comparative Example)

Figure 2:
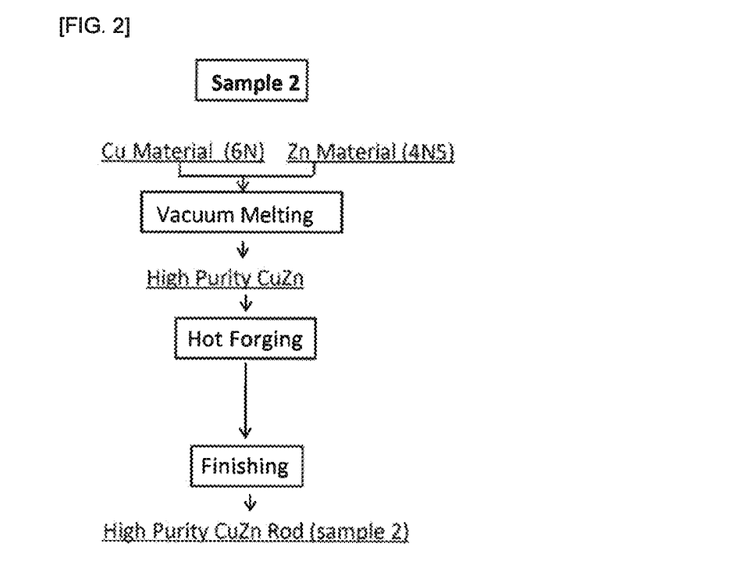
FIG. 2 is an explanatory view of a procedure in Production Example 2.

In the same procedure as that of Production Example 1, a Cu raw material and a Zn raw material were prepared and subjected to vacuum melting to obtain a high purity CuZn alloy, which was subjected to hot forging. The high purity CuZn alloy subjected to the hot forging were subjected to finishing under the same conditions as those of Production Example 1, without carrying out hot isotropic pressing (HIP processing), to obtain high purity CuZn rods (high purity products) (sample 2). An explanatory view of the procedure of Production Example 2 is shown in FIG. 2.

[Production Example 3] (Comparative Example)

A CuZn alloy was produced as follows.
The following Cu raw materials and Zn raw materials were prepared as raw materials:
Cu raw material: metallic copper ingot (4N) (purity 99.99%); and
Zn raw material: metallic zinc ingot (3N) (purity 99.9%).
28.35 kg of the raw material Cu and 17.15 kg of the raw material Zn were melted in the atmosphere (conditions: maintained at 1050° C. for 30 minutes) to obtain a CuZn alloy.
An ingot pipping portion at an upper portion of the ingot was removed from the resulting CuZn alloy, and the ingot having Ψ 132, a length of 248 mm and a weight of 28.4 kg was extruded.
The extrusion was carried out using a die having φ 40 such that a finished diameter would be about φ 41, while heating the ingot at 700° C. An extrusion pressure at this time was from 150 to 170 kg/cm². The extruded ingot was cut on the extruder outlet side every 650 mm to obtain four alloy rods (sample 3).

[Production Example 4] (Comparative Example)

Figure 3:
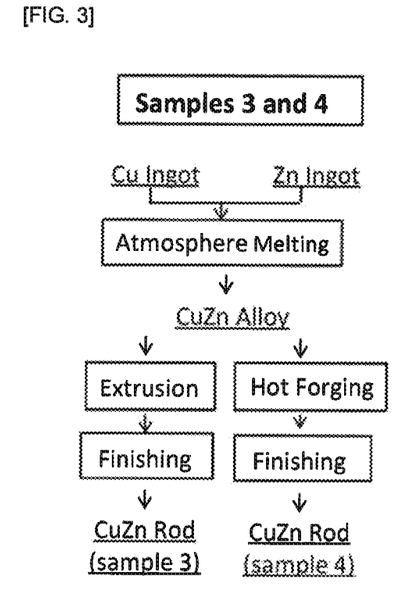
FIG. 3 is an explanatory view of procedures in Production Examples 3 and 4.

In the same procedure as that of Production Example 3, a Cu raw material and a Zn raw material were prepared and melted in the atmosphere to obtain a CuZn alloy.
Forging was carried out by preheating the ingot at a temperature of 850° C. for 3 hours, and carrying out reheating in four steps of: firstly from φ 135 to φ 130 and then φ 130→80 mm square→50 mm square→φ 41 mm at 850° C. for 10 minutes or more in each step. That is, the hot forging process was conducted by carrying out the reheating at 800° C. for 10 minutes or more every time the forging was performed to draw the ingot in the longitudinal direction so as to reduce the cross sectional area of the ingot to 60 to 80% of the original cross sectional area. After carrying out the forging up to φ 41, the ingot was cut every a length of 650 mm to obtain four forged rods (sample 4).
An explanatory view of the procedures of Production Examples 3 and 4 is shown in FIG. 3.

[Composition Analysis]

For the compositions of samples 1 to 4, the metallic elements were analyzed by GD-MS (VG 9000 available from VG Scientific), and the gas components was analyzed by an oxygen/nitrogen analyzer (Model TCH-600) available from LECO for oxygen (O), nitrogen (N) and hydrogen (H), and analyzed by a carbon sulfur analyzer (Model CS-444) available from LECO for carbon (C) and sulfur (S). The results obtained are shown in Table 1 (Table 1-1, and Table 1-2) as described below. For units in the table, those expressed in wt % means % by mass, and those with no specific description means ppm. It should be noted that samples were prepared as described in the procedures of the Production Examples as described above, and samples 1 and 2 were made from the same ingot, and samples 3 and 4 were made from the same ingot.

TABLE 1

| | Samples 3 and 4 | Samples 1 and 2 |
|---|---|---|
| Li | <0.001 | <0.001 |
| Be | 0.07 | <0.001 |
| B | 0.89 | <0.001 |
| F | <0.01 | <0.01 |
| Na | <0.01 | <0.01 |
| Mg | 17 | <0.001 |
| Al | 0.21 wt % | <0.001 |
| Si | 22 | <0.005 |
| P | 44 | <0.005 |
| S | 4.2 | <0.05 |
| Cl | <0.005 | <0.005 |
| K | <0.01 | <0.01 |
| Ca | <0.005 | <0.005 |
| Sc | <0.001 | <0.001 |
| Ti | 0.47 | <0.001 |
| V | 0.09 | <0.001 |
| Cr | 27 | 0.06 |
| Mn | 14 | 0.06 |
| Fe | 490 | 0.75 |
| Co | 3.3 | 0.003 |
| Ni | 320 | 0.05 |
| Cu | Matrix | Matrix |
| Zn | Matrix | Matrix |
| Ga | 0.64 | <0.05 |
| Ge | 3.3 | <0.1 |
| As | 2.1 | <0.005 |
| Se | 0.21 | <0.01 |
| Br | <0.05 | <0.05 |
| Rb | 0.005 | <0.001 |
| Sr | 0.005 | <0.001 |
| Y | 0.01 | <0.001 |
| Zr | 5.7 | <0.001 |
| Nb | 2.0 | <0.005 |
| Mo | 0.40 | <0.005 |
| Ru | <0.1 | <0.1 |
| Rh | <1 | <1 |
| Pd | <0.5 | <0.5 |
| Ag | 29 | 0.50 |
| Cd | 11 | 0.08 |
| In | 11 | <0.05 |
| Sn | 0.10 wt % | <0.005 |
| Sb | 58 | 0.005 |
| Te | 0.52 | <0.05 |
| I | <0.1 | <0.1 |
| Cs | <0.05 | <0.05 |
| Ba | <0.005 | <0.005 |
| La | <0.001 | <0.001 |
| Ce | <0.001 | <0.001 |
| Pr | <0.001 | <0.001 |
| Nd | <0.05 | <0.05 |
| Sm | <0.005 | <0.005 |
| Eu | <0.001 | <0.001 |
| Gd | <0.001 | <0.001 |
| Tb | <0.001 | <0.001 |
| Dy | <0.001 | <0.001 |
| Ho | <0.001 | <0.001 |
| Er | <0.005 | <0.005 |
| Tm | <0.005 | <0.005 |
| Yb | <0.001 | <0.001 |
| Lu | <0.001 | <0.001 |
| Hf | <0.001 | <0.001 |
| Ta | <1 | <1 |
| W | <0.005 | <0.005 |
| Re | <0.005 | <0.005 |
| Os | <0.001 | <0.001 |
| Ir | 0.006 | <0.005 |
| Pt | <0.05 | <0.05 |
| Au | <0.1 | <0.1 |
| Hg | <0.01 | <0.01 |
| Tl | 1.5 | 1.0 |
| Pb | 2.1 wt % | 3.1 |
| Bi | 15 | <0.001 |
| Th | <0.001 | <0.001 |
| U | <0.001 | <0.001 |
| C | 37 | <1 |
| N | 16 | <1 |
| O | 12 | <1 |
| H | 6 | <1 |

[Microscopic Observation]

Samples 1 to 4 were observed under an optical microscope (observation conditions: polished up to #2000 with abrasive paper, then subjected to buffing, and observed using equipment: Nikon ECLIPSEMA 200; magnifications of 100 and 400). The resulting photographs are shown in FIGS. 4 to 7.

Based on the microscopic observation, the number of pores per a surface of 0.5 mm×0.5 mm was counted at 10 positions, and an average value thereof was calculated. The counting was carried out by counting the number of pores with visual observation for the two positions for each sample, and counting the number of pores to determine a binarization threshold (80 in 256 steps) so as to match the counts with the visual observation from those results, and for the remaining eight positions, counting the number of pores by image processing based on the binarization threshold.

Figure 4:
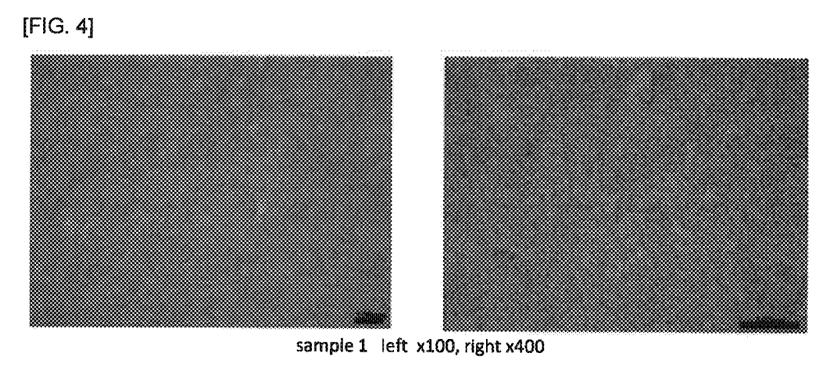
FIG. 4 is an optical microscope photograph of sample 1.

In sample 1, the number of pores per a surface 0.5 mm×0.5 mm was about zero. The area ratio of the pores was 0.0000%.

Figure 5:
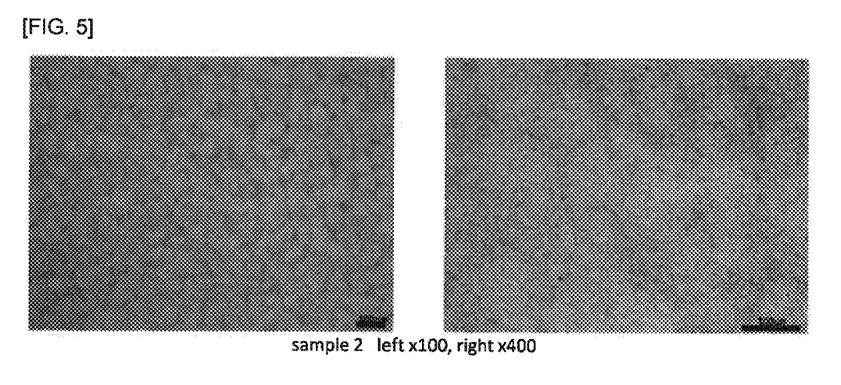
FIG. 5 is an optical microscope photograph of sample 2.

In sample 2, the number of pores per a surface of 0.5 mm×0.5 mm was 5 or less. The area ratio of the pores was 0.0024%.

Figure 6:
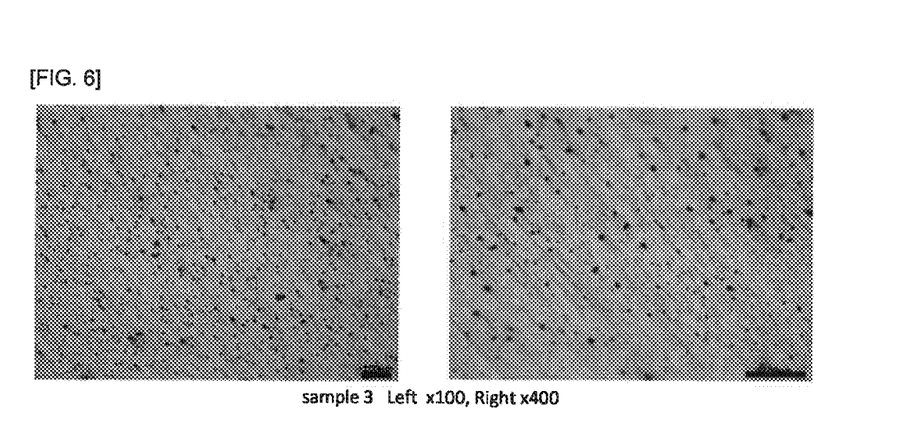
FIG. 6 is an optical microscope photograph of sample 3.

In sample 3, the number of pores per a surface of 0.5 mm×0.5 mm was 1000 or more. The area ratio of the pores was 0.7884%.

Figure 7:
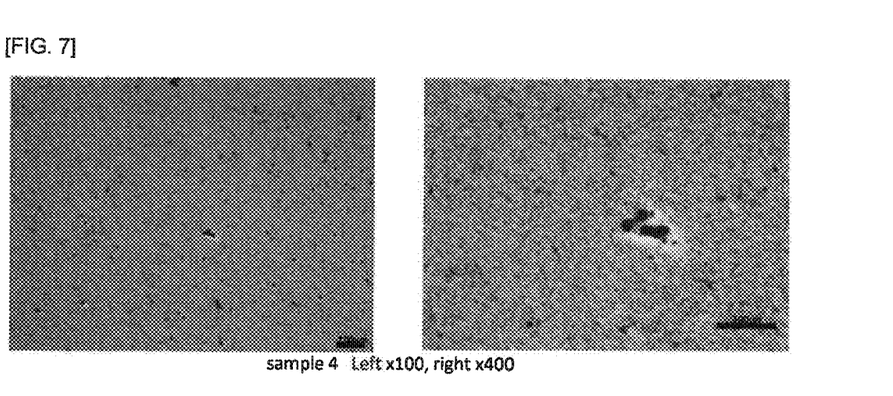
FIG. 7 is an optical microscope photograph of sample 4.

In Sample 4, the number of pores per a surface of 0.5 mm×0.5 mm was 100 or more, and the presence of large pores having a pore diameter of 10 µm or more was observed. The area ratio of the pores was 0.1649%.

Thus, in sample 1 obtained by subjecting the high purity CuZn to the hot forging and HIP processing, no pore was observed in observation with the optical microscope. In sample 2 obtained by subjecting the high purity CuZn to the hot forging, only very few pores were observed in observation with the optical microscope. However, sample 3 obtained by subjecting the CuZn alloy having a degree of purity of a commercially available product to the hot rolling/hot extruding and cold drawing had a very large number of pores. Sample 4 obtained by subjecting the CuZn alloy having a degree of purity of a commercial product to the hot forging had a smaller number of pores than that of sample 3, but it had a very larger number of pores than that of sample 2, and the presence of large pores were observed.

[Corrosion Resistance Test]

[Nitric Acid Test]

Figure 8:
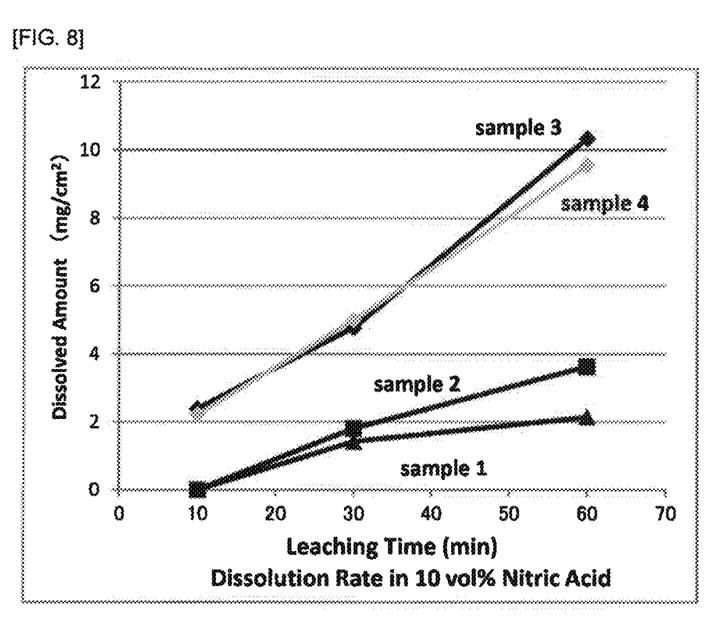
FIG. 8 is a result of a corrosion resistance test using nitric acid.

The corrosion resistance test using nitric acid was carried out in the following procedure:

8.4 g of each of samples 1 to 4 (each size: 10 mm×10 mm×10 mm) was prepared. An aqueous nitric acid solution was prepared by mixing 80 ml of nitric acid (65%) with 420 ml of pure water. Each of samples 1 to 4 was added to 500 ml of the aqueous nitric acid solution, and measured for weight loss after 10 minutes, 30 minutes and 60 minutes of the addition, with stirring at 25° C., to calculate a dissolved amount (mg/cm$^2$) for each of the above times. The results of the corrosion resistance test using nitric acid are shown in FIG. 8.

[Fluonitric Acid Test]

Figure 9:
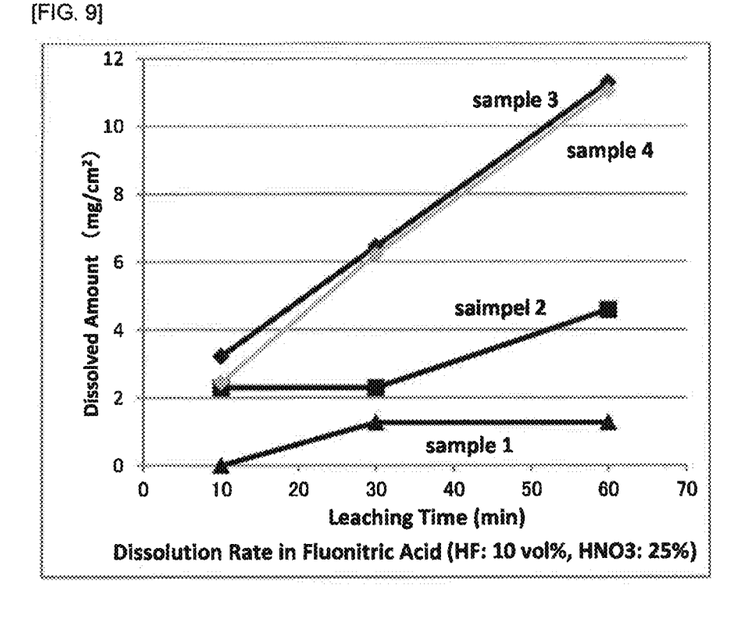
FIG. 9 is a result of a corrosion resistance test using an aqueous fluonitric acid solution.

The corrosion resistance test using fluonitric acid was carried out in the following procedure:

8.4 g of each of samples 1 to 4 (each size: 10 mm×10 mm×10 mm) was prepared. An aqueous fluonitric acid solution was prepared by mixing 20 ml of hydrofluoric acid (46%), 60 ml of nitric acid (65%) and 420 ml of pure water. Each of samples 1 to 4 was added to 500 ml of the aqueous fluonitric acid solution, and measured for weight loss after 10 minutes, 30 minutes and 60 minutes of the addition, with stirring at 25° C., to calculate a dissolved amount (mg/cm$^2$) for each of the above times. The results of the corrosion resistance test using the aqueous fluonitric acid solution are shown in FIG. 9.

Thus, in sample 3 (Comparative Example) and sample 4 (Comparative Example) each having the larger number of pores, the dissolution rapidly progressed in both the nitric acid test and the fluonitric acid test in the same manner. On the other hand, in sample 2 (Comparative Example) having the decreased number of pores as compared with samples 3 and 4, the dissolution was reduced in both the nitric acid test and the fluonitric acid test. For example, after 60 minutes of the nitric acid test, a ratio of the dissolved amount of sample 2 to that of sample 3 was 1/2.85. For example, after 60 minutes of the fluonitric acid test, the ratio of the dissolved amount of sample 2 to that of sample 3 was 1/2.46. On the other hand, in sample 1 (Example) in which substantially no pore was observed, the dissolution was extremely reduced in both the nitric acid test and the fluonitric acid test. For example, after 60 minutes of the nitric acid test, the ratio of the dissolved amount of sample 1 to that of sample 3 was 1/4.83. For example, after 60 minutes of the fluonitric acid test, the ratio of the dissolved amount of sample 1 to that of sample 3 was 1/8.92. Also, after 60 minutes of the nitric acid test, the ratio of the dissolved amount of sample 1 to that of sample 2 was 1/1.69. For example, after 60 minutes of the fluonitric acid test, the ratio of the dissolved amount of sample 1 to that of sample 2 was 1/3.63.

INDUSTRIAL APPLICABILITY

The present invention provides a corrosion-resistant CuZn alloy. The present invention is an industrially useful invention.

What is claimed is:

1. A CuZn alloy, the alloy having a Zn content of from 15 to 55% by mass, the balance being Cu and inevitable impurities,
the CuZn alloy consisting of
(i) a total content of Zn and Cu is 99.995% by mass or more,
(ii) a number of pores is 1/cm$^2$ or less based on optical microscopic observation, and
(iii) a content of P of 0.01 ppm or less, and
wherein the CuZn alloy has a weight loss of less than 2 mg/cm$^2$ after 60 minutes of feeding a 10 mm×10 mm×10 mm sized sample into 500 mL of aqueous fluonitric acid solution at 25° C., said aqueous fluonitric acid solution is a solution prepared by mixing 20 mL of 46% hydrofluoric acid, 60 mL of 65% nitric acid, and 420 mL of pure water;
wherein the CuZn alloy is subjected to hot forging where the CuZn alloy is drawn in a longitudinal direction so as to reduce a cross sectional area of an ingot to 60 to 80% of the original cross sectional area at a temperature in a range of from 600 to 900° C.;
wherein after the hot forging step the CuZn alloy is subjected to hot isotropic pressing at a temperature in a range of from 450 to 650° C. for 1 to 8 hours under a pressure of from 100 to 200 MP;
wherein the CuZn alloy is subjected to the hot forging step and hot isotropic step without being subjected to extrusion; and
wherein after the hot isotropic pressing step, the CuZn alloy is subjected to annealing at a temperature in a range of from 500 to 700° C. for 0.5 to 4 hours by air cooling or furnace cooling.

2. The CuZn alloy according to claim 1, wherein the total content of Zn and Cu is 99.999% by mass or more.

3. The CuZn alloy according to claim 1, wherein the CuZn alloy is an alloy for electrodes.

4. The CuZn alloy according to claim 1, wherein the number of pores having a pore diameter of 10 μm or more is $0.1/cm^2$ or less based on an optical microscopic observation.

5. The CuZn alloy according to claim 1, wherein the CuZn alloy has a content of S of less than 0.05 ppm, a content of Fe of less than 5 ppm, a content of Co of less than 0.05 ppm, a content of Ni of less than 0.1 ppm, a content of As of less than 0.005 ppm, a content of Rh of less than 1 ppm, a content of Ag of less than 1 ppm, a content of Sn of less than 0.5 ppm, a content of Sb of less than 0.005 ppm, a content of Te of less than 0.05 ppm, a content of Tl of less than 3 ppm, a content of Pb of less than 10 ppm.

6. The CuZn alloy according to claim 3, wherein the total content of Zn and Cu is 99.999% by mass or more.

7. The CuZn alloy according to claim 4, wherein the CuZn alloy is an alloy for electrodes.

8. The CuZn alloy according to claim 2, wherein the number of pores having a pore diameter of 10 μm or more is $0.1/cm^2$ or less based on an optical microscopic observation.

9. The CuZn alloy according to claim 2, wherein the CuZn alloy has a content of S of less than 0.05 ppm, a content of Fe of less than 5 ppm, a content of Co of less than 0.05 ppm, a content of Ni of less than 0.1 ppm, a content of As of less than 0.005 ppm, a content of Rh of less than 1 ppm, a content of Ag of less than 1 ppm, a content of Sn of less than 0.5 ppm, a content of Sb of less than 0.005 ppm, a content of Te of less than 0.05 ppm, a content of Tl of less than 3 ppm, a content of Pb of less than 10 ppm.

* * * * *